(12) United States Patent
Leung

(10) Patent No.: US 6,461,752 B1
(45) Date of Patent: Oct. 8, 2002

(54) PORTABLE ELECTRIC GENERATOR WITH THERMAL ELECTRIC CO-GENERATOR

(75) Inventor: Fee Chan Leung, Hazlet, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/910,563

(22) Filed: Jul. 20, 2001

Related U.S. Application Data

(63) Continuation-in-part of application No. 09/310,677, filed on Apr. 19, 1999, now abandoned.

(51) Int. Cl.[7] .......................... H01M 8/00; H01M 8/18; H02K 57/00; H02K 5/00; F41A 21/00
(52) U.S. Cl. ...................... 429/20; 429/24; 429/26; 310/40 MM; 42/76.001; 322/1; 89/14.1
(58) Field of Search .................. 310/40 MM; 42/76.01; 322/1, 2 R; 89/14.1; 136/204, 205, 225, 242; 429/11, 20, 24, 26, 120

(56) References Cited

U.S. PATENT DOCUMENTS

| | | | | |
|---|---|---|---|---|
| 5,310,608 A | * | 5/1994 | Ishizawa et al. | 429/24 |
| 5,501,781 A | * | 3/1996 | Hsu et al. | 429/26 |
| 5,563,368 A | * | 10/1996 | Yamaguchi | 136/205 |
| 5,659,148 A | * | 8/1997 | Isgen | 42/76.01 |
| 5,753,383 A | * | 5/1998 | Cargnelli et al. | 429/26 |
| 5,889,735 A | * | 3/1999 | Kawata et al. | 136/205 |
| 5,932,940 A | * | 8/1999 | Epstein et al. | 310/40 MM |
| 5,949,176 A | * | 9/1999 | Westlund | 136/205 |
| 6,075,199 A | * | 6/2000 | Wong | 136/205 |

FOREIGN PATENT DOCUMENTS

| | | | |
|---|---|---|---|
| GB | 2 366 943 A | * | 11/1999 |
| JP | 04 104 472 A | * | 4/1992 |

* cited by examiner

Primary Examiner—Patrick Ryan
Assistant Examiner—Gregg Cantelmo
(74) Attorney, Agent, or Firm—Michael Zelenka; George B. Tereschuk

(57) ABSTRACT

The invention is an electric generator comprising a portable electric generator and a thermal electric co-generator. The co-generator converts heat produced by the portable electric generator into electricity. In one embodiment of the present invention, the portable electric generator is a microturbine. In another embodiment, the portable electric generator is a fuel cell. In a further embodiment, the thermal electric generator comprises a hot thermocouple and a cold thermocouple.

18 Claims, 5 Drawing Sheets

PORTABLE ELECTRIC GENERATOR WITH THERMAL ELECTRIC CO-GENERATOR

CONTINUATION-IN-PART

This application is a Continuation-In-Part of U.S. Patent And Trademark Office Application No. 09/310,677, entitled, "portable Electric Generator With Thermal Electric Co-Generator," which was filed on Apr. 19, 1999, by the same inventor herein, and is now abandoned. This Continuation-In-Part is being filed under 35 USC §120 and 37 CFR §1.53, and priority from that application is hereby claimed.

GOVERNMENT INTEREST

The invention described herein may be manufactured, used and licensed by or for the Government of the United States of America without the payment by the Government of any royalties thereon.

BACKGROUND OF THE INVENTION

1. Field of the Invention

The invention relates generally to thermal electric generation, and in particular to generating electricity from heat produced by the combustion of hydrocarbon fuels.

2. Background of the Invention

Currently, electric generators produce electricity by converting one form of energy into electricity. For example, metal hydride fuel cells, when mixed with water, produce hydrogen from an exothermic reaction. This hydrogen is then mixed with other chemicals to generate electricity. Another type of generator uses energy from fossil fuel to rotate a turbine. The mechanical rotation of the turbine generates electricity.

In both types of electric generators described above, the generators produce a large amount of heat. The temperature inside of the generator can reach as high as 600 degrees K. This heat is not used to generate electricity. Instead, it is lost to the environment as waste. This loss is not a problem in conventional generators because there is no real advantage in converting the excess heat from a 250-Watt generator into a few extra watts of power. Also, the fuel supply for traditional electric generators is relatively inexpensive and readily available. For example, fossil fuel can be easily bought at a reasonable price across the country. Therefore, it is not necessary to use this excess heat to generate electricity, and it is lost to the environment as waste.

However, people who use electric generators in a remote environment must carry their own fuel supply with them, because fuel is not readily available in this remote environment. Supplying additional fuel to a person in a remote environment is very expensive. If the person is lost in the woods, or is stranded at sea, supplying additional fuel becomes impossible.

There are numerous uses for electric generators in remote environments. These uses include providing electricity to electronic survival equipment in lifeboats, or to rescuers in a dense forest; or providing electricity for special industrial uses, such as remote exploration for oil. One of the most important uses for portable electric generators capable of being carried by a person is for national defense. Soldiers in the field need electric generators to provide electricity to their radios and electronic equipment.

The microturbine generators and fuel cell generators used in these remote environments reach temperatures above 300 degrees F. Losing energy from the limited fuel supply as wasted heat is significant, because the fuel supply is very scarce. Between 6 to 30 percent of the energy from the total fuel supply is converted into excess heat, which is then lost to the environment.

For example, the portable electric generators used by soldiers in the field generate 360 to 720 Watt-hours of electricity per day. The heat produced by these generators is a source of energy that can be harnessed to produce 1 or 2 Watts of electricity per hour, which is up to 48 Watt-hours of electricity per day. Thus, the limited fuel supply can be conserved if the heat produced by the generators is not wasted. The batteries that are recharged by these generators can last 20 or 30 percent longer. This increase in electric power can mean the difference between life and death to soldier at the front line, or to a person stranded in a lifeboat.

Therefore, there is a strong need, in a remote environment, to convert excess heat produced by electric generators into electric power. The present invention meets this need by using thermal electric generators to convert excess heat from electric generators into electric power. The present invention has several advantages over conventional portable generators. The present invention conserves the fuel used by the generator, extends the life of batteries that are recharged by the generator, and provides more electricity to a person in a remote environment than conventional portable generators.

The present invention also has several advantages over traditional thermal electric generators. Traditionally, thermal electric generators are large stand-alone devices, which, by themselves, provide electric power. A disadvantage, however, is that these generators are too large and use too much fuel to be carried by people into remote environments.

Smaller thermal electric generators, capable of generating 1 or 2 Watts of electricity an hour, can be used, together-with other types of electric generators, to provide an adequate supply of electricity in a remote environment. When thermal electric generators are attached to the high temperature areas of other types of electric generators, the result is an electric generator that effectively uses the limited fuel supply that is carried by a person into a remote environment.

SUMMARY OF THE INVENTION

The invention is an electric generator comprising a portable heat generator and a thermal electric co-generator. The co-generator converts heat produced by the portable heat generator into electricity. In one embodiment of the present invention, the portable generator is a microturbine. In another embodiment, the portable generator is a fuel cell. In a further embodiment, the heat generator is the barrel of a weapon. In a further embodiment, the thermal electric generator also functions as a sensor for measuring the temperature of the heat generator.

DETAILED DESCRIPTION OF THE DRAWING

Portable Heat Generator with Thermal Electric Co-generator

Figure 1:
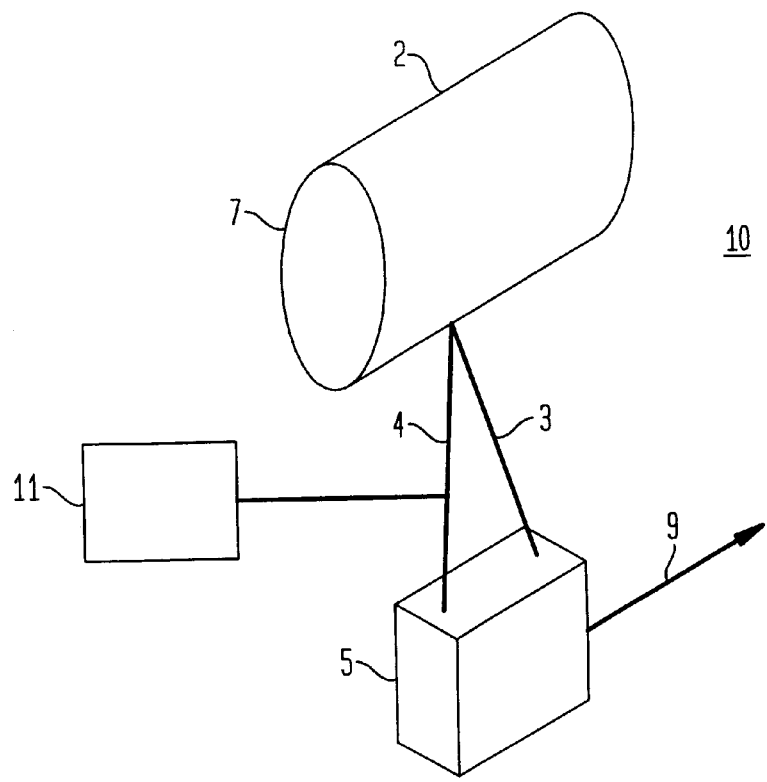
FIG. 1 shows an embodiment of the heat generator and electric co-generator.
Figure 2A:
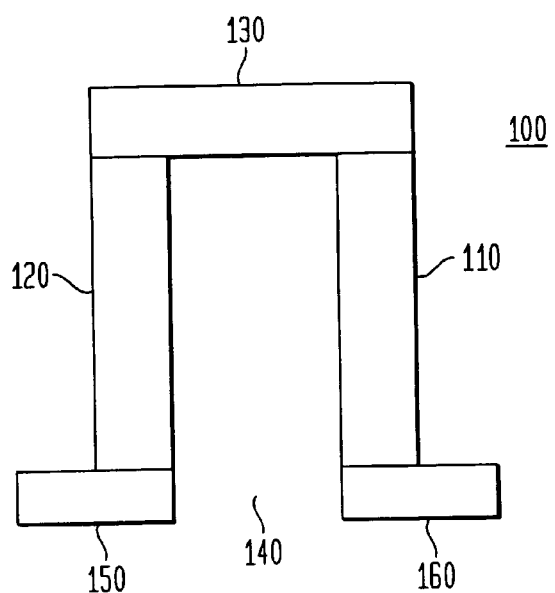
FIGS. 2A–2C show the thermal electric co-generators.
Figure 2B:
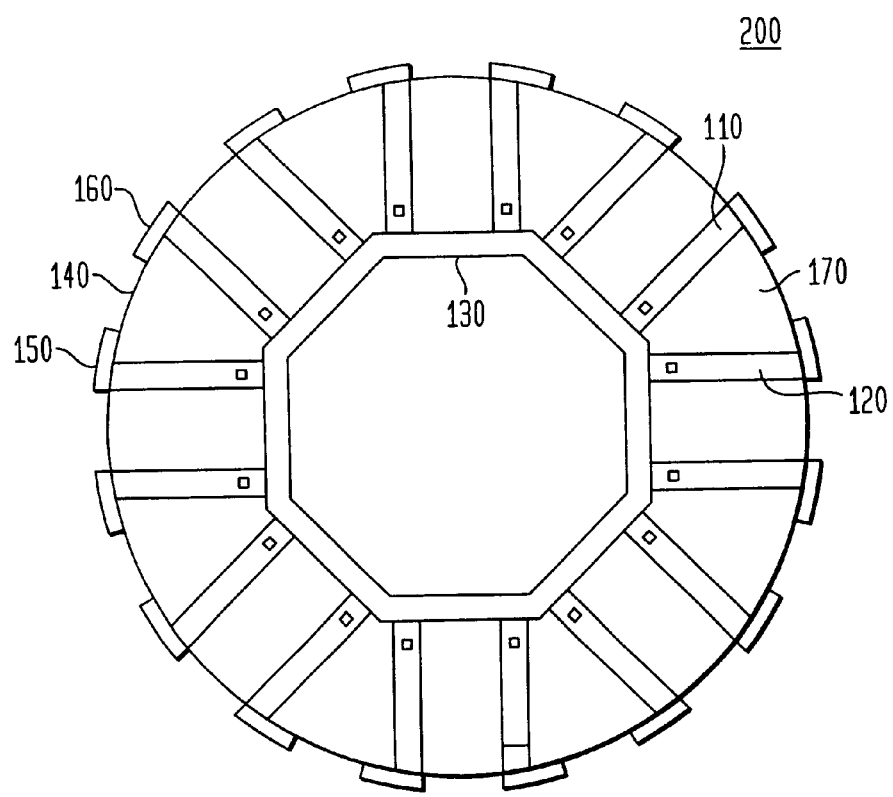
Figure 2C:
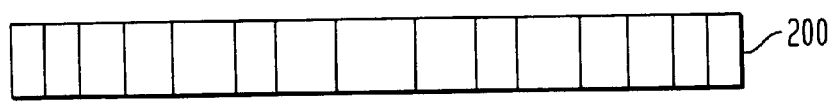

The portable heat generator with a thermal electric co-generator device 10 of the present invention is shown generally in FIG. 1. The portable heat generator 2 converts one form of energy 7 into heat. The hot thermocouple 3 is attached to the generator 2, preferably in the region of the generator 2 that has the highest temperature. An end of cold thermocouple 4 is attached to the hot thermocouple 3. Another end of the cold thermocouple 4 is external to the generator 2. For example, cold thermocouple 4 is connected to an object from the outside environment, indicated by box 11, such as the body of a person, or the surrounding air. Thermal electric generator 5 produces electricity 9 from the temperature difference between the hot thermocouple 3 and cold thermocouple Referring now to FIG. 2A, a thermal electric generator, or co-generator, 100 is simply two dissimilar metals 110 and 120 connected at a common junction, 130, such as a hot plate, which is subjected to a heat source at temperature T1. The open end 140 of the two dissimilar metals will be exposed to a cooler temperature T2 by cooling fins 150 and 160. Fin 150 is the negative terminal, and fin 160 is the positive terminal. Due to the molecular nature of the metals, an electrical potential will be formed across the open end 140 of the two dissimilar metals 110 and 120 when a load is applied. The larger the difference between temperature T1 and T2, the higher the voltage that exists across the open end. Also, increasing the surface area of the common junction 130 increases the number of electrons that are generated. The common junction, dissimilar metals, and open end cooling fins can be etched on to a flat high temperature insulating material 170, as shown in FIG. 2B. FIG. 2C is a side view of the FIG. 2B thermal co-generator 200.

For example, the thermal electric generators 100 can be etched and connected in electrical series to form an annular disk 200. A plurality of these disks can be connected in electrical series or electrical parallel to form a concentric shroud for covering a heat source. The thermal electric generators in the disk will harvest the heat generated by the heat source and convert the heat into electricity.

The electric signal that is produced by the thermal electric generator is directly related to the temperature of the heat source. Therefore, the thermal electric generator can be used to sense, or measure, the temperature of the heat source. This temperature measurement can then be used to modify, adjust, or control the operating characteristics of the heat source. For example, if the heat source is the barrel of a weapon, the temperature measurement can be fed into a ballistic computer or weapon sight to adjust the weapon and increase its accuracy. If the heat source is a fuel cell, the temperature of the fuel cell can be used to keep the fuel cell at an optimum operating condition.

Microturbine Generator with Thermal Electric Co-generator

Figure 3:
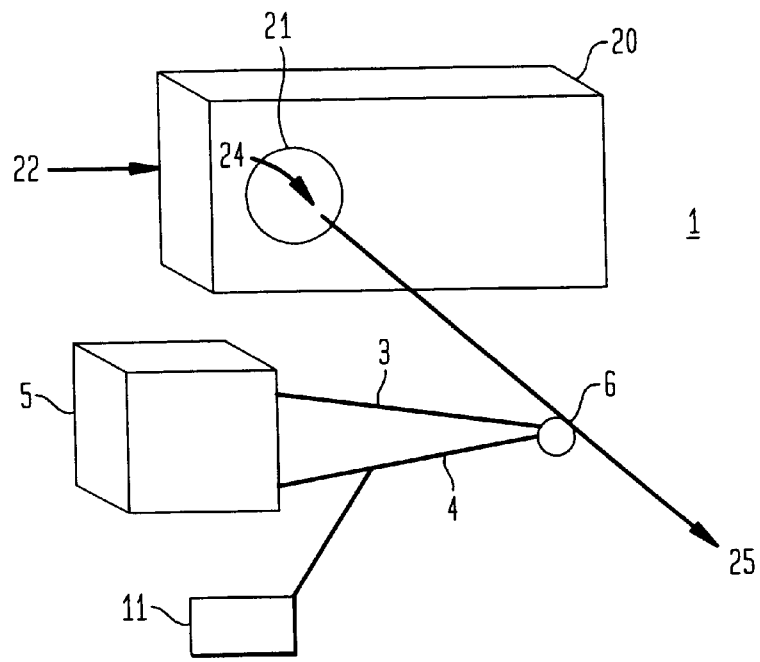
FIG. 3 shows the microturbine electric generator with thermal electric co-generator.

The present invention 1 shown in FIG. 3 uses a microturbine 20 to serve as the portable heat generator 2 shown in FIG. 1. One type of microturbine is a 50-watt microturbine electric generator, which is used by soldiers in the US Army to recharge batteries on the front. The microturbine 20 burns hydrocarbon fuel 22 to drive a turbine 21 to generate electricity.

The microturbine electric generator 20 can be produced from silicate ceramic materials that can withstand high temperature conditions. One type of microturbine electric generator 20 burns hydrocarbon fuel, such as jet fuel for example. The combustion of the fuel causes the turbine 21 to spin at a high rate of speed. For example, known turbines can spin at over 2.4 million revolutions per minute. This mechanical motion is converted into electricity.

The combustion of the fuel 22 and the motion of the turbine 21 produce a large amount of heat. In fact, the temperature inside of the microturbine generator 20 can reach above 600 degrees K. In conventional electric generators, this heat is removed as waste. However, people in remote environments, who only have a limited supply of fuel, cannot afford to waste the energy from the excess heat. Rather, they need to use all the energy they can to generate electricity. Clearly, this shows a strong need to use the heat produced by microturbine electric generators to generate additional electricity. The present invention is an improvement over conventional electric generators, because the present invention uses the heat that previously is lost as waste to generate electricity.

The present invention 1 uses high and low temperature thermocouples 3 and 4 to convert this heat into electricity, thus overcoming the disadvantage of wasting the energy that produced the heat. As a result, the generator 1 is more efficient.

The microturbine electric generator 20 receives hydrocarbon fuel 22. This fuel is ignited so that chemical energy is produced and is used to turn turbine 21. The gases 24 produced from the combustion of the fuel 22 are removed through exhaust 25. The exhaust gases 24 contain a large amount of heat.

The temperature of hot thermocouple 3, located in the exhaust 25 of the generator 20, is raised after the exhaust gases 24 pass over the hot thermocouple 3, the hot thermocouple being heated to a temperature greater than or equal to 212° F. Cold thermocouple 4, which is external to the generator 20, remains at a relatively low temperature. Cold thermocouple 4 can be connected to an object 11, such as a person's body, or another object from the outside environment. Consequently, the temperature of cold thermocouple 4 is less than or equal to 98.6° F., which is much lower than hot thermocouple 3. The hot and cold thermocouples 3 and 4, respectively, are both connected at common junction 6 to form thermal electric generator 5. The temperature difference between the thermocouples produces electricity by thermal electric generation.

The heat produced by the combustion of the fuel is thus used to generate electricity. Therefore, the electricity produced by the thermal electric cogenerating microturbine generator is greater than the prior art turbine generators.

Hydrogen Fuel Cell Electric Generator with Thermal Electric Co-generator

Figure 4:
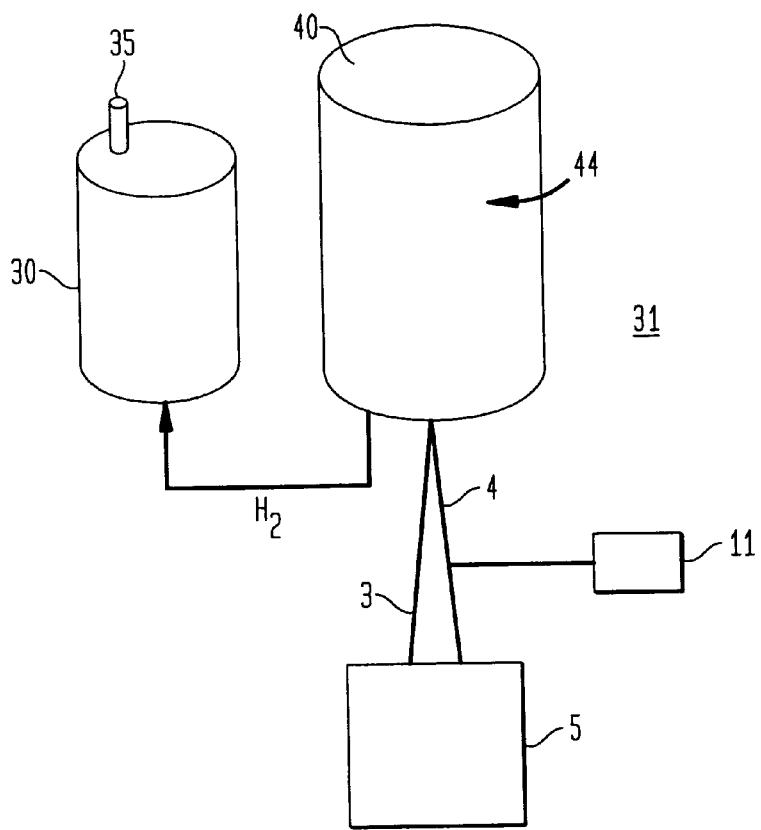
FIGS. 4 and 5 show the hydrogen fuel cell electric generator with thermal electric co-generator.

Another embodiment is shown in FIG. 4. In this embodiment, an electric generator 31 is designed so that it will generate additional electricity from the heat produced by its hydrogen generator 40 when hydrogen evolves from an exothermic reaction of metal hydride and water.

A fuel cell electric generator 30 produces electricity by combining hydrogen with oxygen. The fuel cell electric generator 30 receives oxygen from the outside air through vent 35. The hydrogen is supplied to the fuel cell electric generator 30 by the hydrogen generator 40.

The hydrogen generator 40 is needed because hydrogen gas is extremely volatile, and cannot be safely stored when it is in gaseous form. Therefore, an inert form of hydrogen, such as metal hydride, is stored in the storage tank 44 of the hydrogen generator 40. The hydrogen generator 40 converts the inert form of hydrogen located in the storage tank 44 into hydrogen gas by combining the metal hydride with water.

This combination causes an exothermic reaction, which produces hydrogen gas, metal hydroxide, and heat. The hydrogen gas is sent from the hydrogen generator 40 to the electric generator 30. During the exothermic reaction, the temperature inside the hydrogen generator 40 can rise above 140 degrees C. In conventional electric generators, this excess heat is removed from the hydrogen generator as a wasted by product. In the present invention, this heat is used to generate additional electricity.

Hot thermocouple 3 is placed inside the storage tank 44 and cold thermocouple 4 is placed on an object 11 outside of the storage tank, preferably on the user's body during the day and placed in the outside environment at night. The temperature differences between the thermocouples can produce electricity by thermoelectric generation.

Thermoelectric generator 5, which includes the hot and cold thermocouples, produces at least 2 watts constantly or 48 watt-hours of energy per day. This is a significant amount of electricity in a remote environment. For example, the army's future land warrior will need between 360 and 720 watt-hours of energy a day. The thermal electric generator will provide a large percentage (greater than 6 percent) of the daily energy that is needed by a soldier, which would otherwise be lost as wasted heat.

Figure 5:
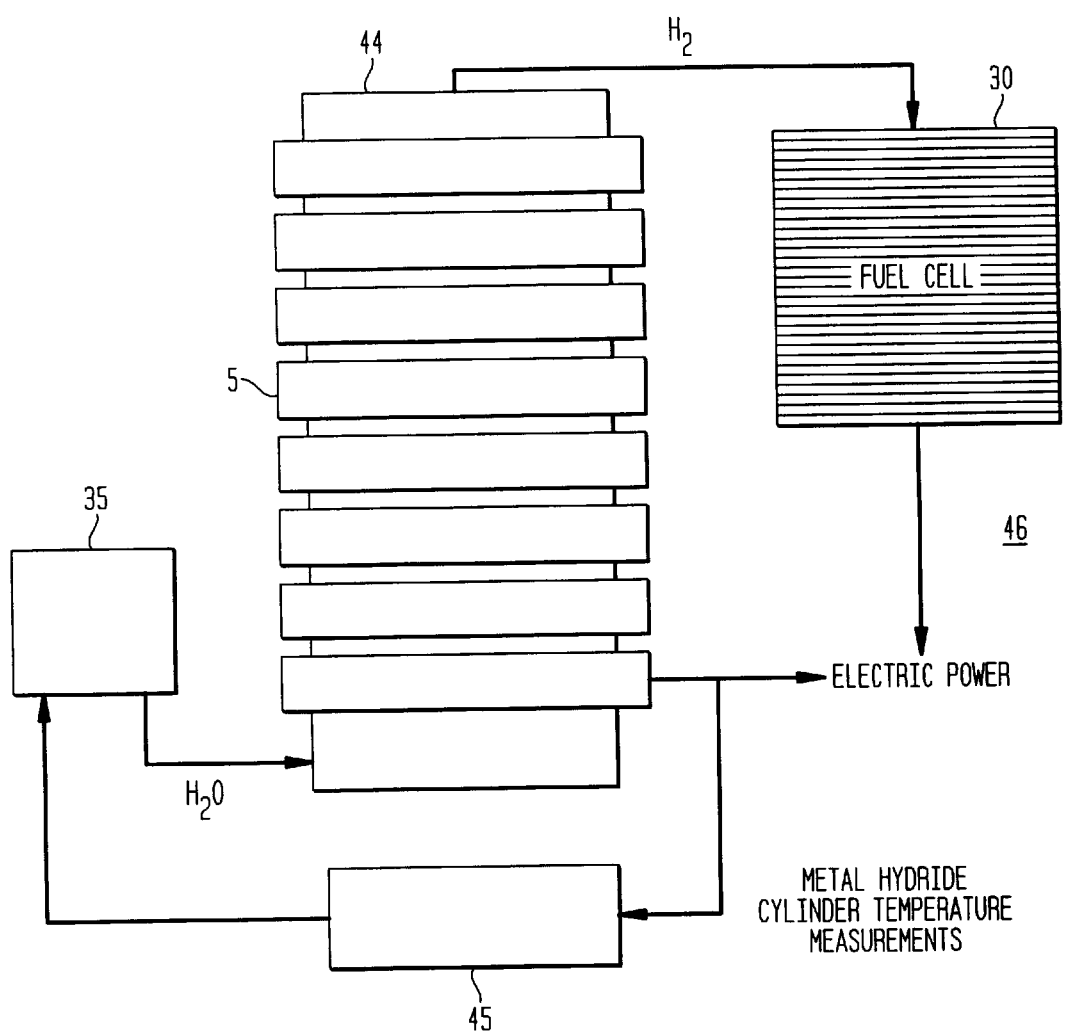

In one embodiment, the thermal electric generator 5 shown in FIG. 5 is a shroud formed of concentric disks, where each disk is a plurality of electrically connected thermal electric generators, as shown in FIG. 2. The shroud 5 is placed around the metal hydride storage cylinder 44. As water is added, hydrogen is generated, and the cylinder 44 produces heat. The shroud 5 harvests the heat from the cylinder 44 and converts it into electricity. Additionally, the amount of electricity generated by the shroud 5 is related to the temperature of the cylinder 44. This electric signal is converted into a temperature measurement by fuel cell control 45. The fuel cell control 45 then uses this temperature information to adjust and control the rate that water is added into the metal hydride storage cylinder 44 from water bladder 35.

A Barrel of a Weapon having a Thermal Electric Generator

In a third embodiment, the present invention includes a thermal electric generator to harvest electric power generated when a weapon is fired.

There is a need to provide power for portable electronics used by a soldier in a remote environment without adding additional weight to the equipment carried by the soldier. Weapons, such as the squad automatic weapon (SAW), M60 machinegun, and 0.50 caliber machinegun, generate substantial amounts of heat at their barrel when they are fired. At sustained firings, the barrel temperature exceeds 212 degrees F.

A hot barrel affects the muzzle velocity, which reduces the accuracy of the weapon. As a result, the barrel must be changed after it becomes hot from sustained firings. Machinegun crews are issued asbestos gloves to do this. The heat produced by automatic weapons is currently released into the environment as waste. The present invention includes a thermal electric generator to harvest power from this heat.

Figure 6:
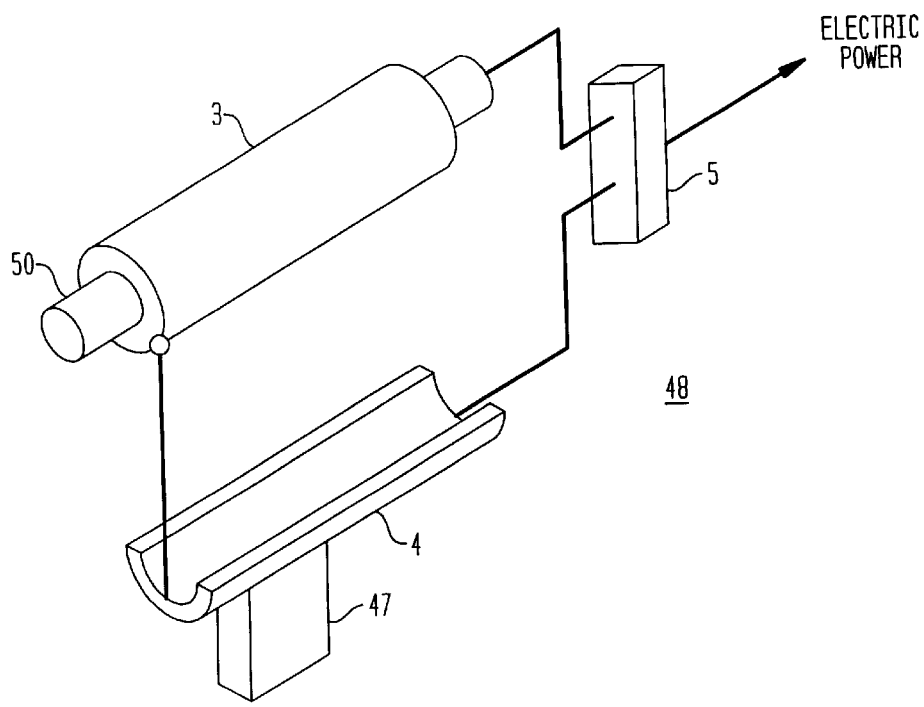
FIGS. 6 and 7 show the weapon heat generator with thermal electric co-generator.

Referring to FIG. 6, hot thermocouple 3, shaped like a cylindrical shroud, is wrapped around the barrel 50. Cold temperature thermocouple 4 is embedded into the weapons hand-guard 46 or into an external structure. The temperature difference between the thermocouples produces electricity by thermoelectric generation. Thermoelectric generator 5 produces at least 2 watts of electricity.

This amount of electricity is significant in a remote environment, because this electricity can be used to provide power to the electronic equipment used by a person in the remote environment. For example, the army's future land warrior will carry a thermal weapons sight (TWS) on the weapon. The TWS draws about 6.5–8.5 watts nominally. The Weapon Thermal Electric Co-Generator (WTEC) 5 produces 2 watts of electric power every time the weapon is fired. This power can be used to operate the TWS and extend the life of the TWS battery. The present invention does not increase the soldier's combat weight because the fuel for the WTEC 5 is the ammunition. The soldier is already carrying the ammunition and the WTEC 5 provides the means to convert the chemical energy of the ammunition into electrical power.

The WTEC 5 can be applied to larger weapons such as towed guns and howitzers. The hot thermocouple 3 can be on the weapon barrel 50 and the cold thermocouple 4 can be on the weapon carriage, and the power generated can be used to help power a ballistic computer.

In addition, the electric power produced by the WTEC 5 can be used to measure the temperature of the barrel 50. The temperature of the barrel 50 affects the muzzle velocity, which reduces the accuracy of the weapon. This temperature measurement can be used by computerized weapon sights, or ballistic computers, to compensate for the increase in temperature and improve the accuracy of the weapon.

Figure 7:
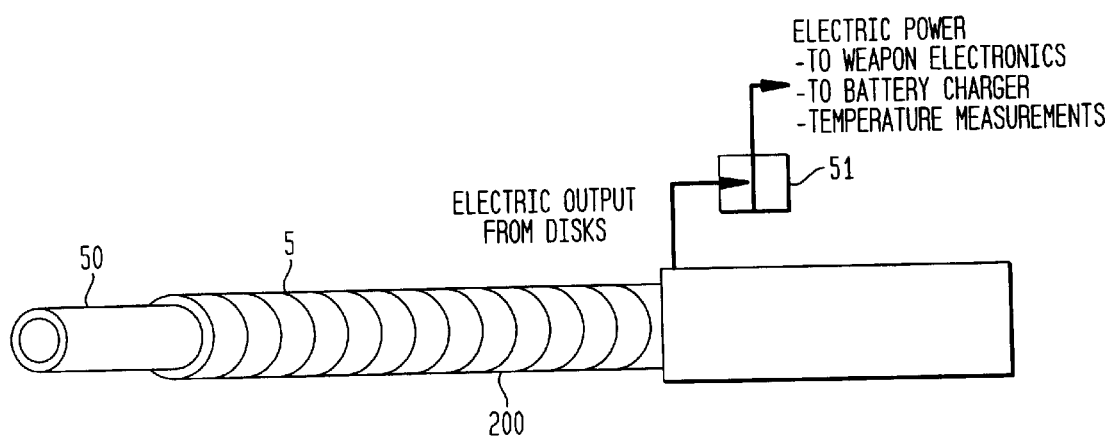

FIG. 7 shows another embodiment. The thermal electric generator is a shroud 5 formed from thermal electric disks 200 as shown in FIG. 2B. Each disk 200 is placed around the gun barrel 50. The disks 200 can be connected in electrical series or parallel to form concentric shroud 5 around barrel 50. As the weapon undergoes sustained firing, the barrel 50 produces heat. The thermal electric generator 5 harvests the heat from the barrel and converts it into electricity.

The electric power is fed into a DC/DC converter 51 and is used to provide power to the weapon's electronics or the weapon's battery. For large weapons, the electric signal is converted into a measurement of temperature at the barrel, and sent to a ballistic computer for increasing the weapon's accuracy.

What I claim is:

1. A portable thermal electricity generating device, comprising:

a portable generator, having a microturbine electric generators heat;

a thermal electric co-generator, having a hot thermocouple and a cold thermocouple, said hot thermocouple being attached to said portable generator;

said cold thermocouple being connected to said hot thermocouple; and said thermal electric co-generator converts said heat into an electrical current.

2. The portable thermal electricity generating device, as recited in claim 1, wherein the microturbine comprises:

a turbine, which is rotated by chemical energy released from ignited fuel, generates mechanical energy;

an exhaust for removing hot gases produced by the ignited fuel; and the microturbine generator converts the mechanical energy of the rotating turbine into electricity.

3. The portable thermal electricity generating device, as recited in claim 2, further comprising:

the hot thermocouple is attached to the portable generator at the exhaust, so that the hot thermocouple receives energy from the hot gases as the gases pass through the exhaust, said hot thermocouple being heated to a temperature greater than or equal to 212° F.; and the cold thermocouple, having a temperature less than or equal to 98.6° F., is attached to the hot thermocouple for creating a temperature difference between the thermocouples;

wherein the temperature difference between the thermocouples generates electricity.

4. The portable thermal electricity generating device, as recited in claim 3, wherein the thermal electric co-generator further comprises a means for sensing the temperature of the portable generator.

5. The portable thermal electricity generating device, as recited in claim 4, further comprising a means for using the temperature measurement to adjust the portable generator.

6. The portable thermal electricity generating device, as recited in claim 5, further comprising said cold thermocouple is connected to an object from an outside environment.

7. The portable thermal electricity generating device, as recited in claim 6, further comprising said object is a human body.

8. A portable thermal electricity generating device, comprising:
    a portable generator having a fuel cell electric generator generates heat;
    a thermal electric co-generator, having a hot thermocouple and a cold thermocouple, said hot thermocouple being attached to said portable generator;
    said cold thermocouple is connected to said hot thermocouple; and
    said thermal electric co-generator converts said heat into an electrical current.

9. The portable thermal electricity generating device, as recited in claim 8, wherein the fuel cell electric generator generates electricity by combining hydrogen with oxygen.

10. The portable thermal electricity generating device, as recited in claim 9, wherein:
    the portable generator includes a hydrogen generator; and
    the hydrogen generator produces heat from an exothermic reaction of metal hydride and water.

11. The portable thermal electricity generating device, as recited in claim 10, further comprising:
    the hot thermocouple receives energy from the heat produced by the exothermic reaction, said hot thermocouple being heated to a temperature greater than or equal to 212° F.; and
    the cold thermocouple, having a temperature less than or equal to 98.6° F., is attached to the hot thermocouple for creating a temperature difference between the thermocouples, wherein the temperature difference between the thermocouples generates electricity.

12. The portable thermal electricity generating device, as recited in claim 11, further comprising said cold thermocouple is connected to an object from an outside environment.

13. The portable thermal electricity generating device, as recited in claim 12, further comprising said object is a human body.

14. A weapon thermal electricity generating device, comprising:
    a portable generator having a weapon with a barrel that generates heat;
    said thermal electric co-generator, having a hot thermocouple and a cold thermocouple, said hot thermocouple being attached to said portable generator;
    said cold thermocouple being connected to said hot thermocouple; and
    said thermal electric co-generator converts said heat from the barrel into an electrical current.

15. The weapon thermal electricity generating device, as recited in claim 14, further comprising:
    the hot thermocouple is attached to the barrel for receiving heat generated by the barrel, said hot thermocouple being heated to a temperature greater than or equal to 212° F.; and
    the cold thermocouple, having a temperature less than or equal to 98.6° F., is attached to the hot thermocouple for creating a temperature difference between the thermocouples;
    wherein the temperature difference between the thermocouples generates electricity.

16. The weapon thermal electricity generating device, as recited in claim 15, further comprising said cold thermocouple is connected to an object from an outside environment.

17. The weapon thermal electricity generating device, as recited in claim 16, further comprising said object is a human body.

18. A portable thermal electricity generating device, comprising:
    a heat source;
    a group of thermal electric co-generators;
    each of said group of thermal electric co-generators further comprising a first metal member and a second metal member composed of two dissimilar metals, said first metal member and said second metal member being connected at a common junction, define an opening opposite said common junction;
    said heat source heats said common junction to a temperature T1;
    said first metal member having a negative cooling fin and said second metal member having a positive cooling fin, exposes said opening to a temperature T2 that is cooler than said temperature T1;
    said negative cooling fin and said positive cooling fin being located in the vicinity of said opening providing a cold thermocouple;
    said group of thermal electric co-generators are disposed on a plurality of annular disks, with each of said common junctions facing a center region of each of said plurality of annular disks;
    said plurality of annular disks are disposed around said heat source;
    said temperature T1 being greater than or equal to 212° F. and said temperature T2 being less than or equal to 98.6° F. provides a temperature difference that generates an electric current; and
    said cold thermocouple is attached to an object from an outside environment, wherein said object is a human body.

* * * * *